(12) United States Patent
Kubota et al.

(10) Patent No.: US 7,650,905 B2
(45) Date of Patent: Jan. 26, 2010

(54) EMERGENCY ISOLATION VALVE APPARATUS

(75) Inventors: Motohiro Kubota, Saitama (JP);
Wataru Kunieda, Saitama (JP)

(73) Assignee: Tyco Flow Control Kabushiki Kaisha, Saitama (JP)

( * ) Notice: Subject to any disclaimer, the term of this patent is extended or adjusted under 35 U.S.C. 154(b) by 387 days.

(21) Appl. No.: 11/123,923

(22) Filed: May 6, 2005

(65) Prior Publication Data

US 2005/0247351 A1   Nov. 10, 2005

(30) Foreign Application Priority Data

May 6, 2004   (JP)   ................................ 2004-137186

(51) Int. Cl.
*F16K 31/122* (2006.01)
(52) U.S. Cl. ....................... 137/554; 251/25; 251/26; 251/29; 251/73
(58) Field of Classification Search ................ 137/554; 251/25, 26, 29, 73
See application file for complete search history.

(56) References Cited

U.S. PATENT DOCUMENTS

| 1,163,818 | A | * | 12/1915 | Hadden et al. | .................. | 251/73 |
| 3,056,573 | A | * | 10/1962 | Matheson et al. | .............. | 251/31 |
| 3,282,552 | A | * | 11/1966 | Sommese, Sr. | ................. | 251/26 |
| 3,429,180 | A | * | 2/1969 | Vind | ............................. | 73/168 |
| 3,591,127 | A | * | 7/1971 | Luger et al. | .................... | 251/73 |
| 3,789,875 | A | * | 2/1974 | McGee | ........................ | 137/554 |
| 4,471,938 | A | * | 9/1984 | Schwarz | ....................... | 251/25 |
| 4,503,717 | A | * | 3/1985 | Keller et al. | ................... | 251/73 |
| 5,095,804 | A | * | 3/1992 | Burch | .......................... | 91/361 |
| 5,143,119 | A | * | 9/1992 | Plangger | ...................... | 73/168 |
| 5,217,199 | A | * | 6/1993 | Frey | ............................. | 251/29 |
| 5,280,807 | A | * | 1/1994 | Frey et al. | ..................... | 251/29 |
| 6,659,247 | B2 | * | 12/2003 | Lafler et al. | ................... | 251/25 |

FOREIGN PATENT DOCUMENTS

| JP | 10-61812 | 3/1998 |
| JP | 2002-71039 | 3/2002 |

* cited by examiner

*Primary Examiner*—John Rivell
(74) *Attorney, Agent, or Firm*—Wyatt B. Pratt; Daniel N. Daisak

(57) ABSTRACT

An emergency isolation valve has a valve plug in a valve body connected to a pipeline. The valve plug is connected to a valve shaft around which a sector gear is provided and engaged with a rack of a piston rod in a cylinder. The piston rod has a piston at one end and is connected to a compression spring at the other end. The piston is moved by air supplied into a cylinder from a compressed air source via a fluid control and a solenoid selector valve. Air supply stops and a discharge hole of the cylinder is opened, so that air is discharged to the outside. The piston is returned by the compression spring to close the discharge hole. At the same time stop of the piston rod is detected by a sensor thereby checking whether to actuate the valve plug normally even during operation.

9 Claims, 6 Drawing Sheets

EMERGENCY ISOLATION VALVE APPARATUS

BACKGROUND OF THE INVENTION

The present invention relates to an emergency isolation valve apparatus on a flow path or a pipeline in an oil refining plant and especially to an emergency isolation valve for checking motion of a valve plug during operation of equipment such as a plant.

In an emergency isolation valve, a valve plug is opened when a plant normally operates, and if abnormality occurs owing to earthquake, the valve plug is shut down to prevent any accidents. Whether the emergency isolation valve properly operates is periodically checked, and it is required to inspect it even during operation of the plant to improve reliability.

Japanese Patent Pub. No.2002-71039A discloses a weight-type emergency isolation valve. A valve plug is checked only at full opening and full closing, but cannot be inspected during operation.

To solve such disadvantage, Japanese Patent Pub. No.10-61812A discloses an emergency isolation valve in which a check valve or a solenoid selector valve for supplying pressurized oil to a cylinder for driving an emergency isolation valve is actually operated for checking their operations. But it is impossible to check whether or not a valve plug itself properly operates. If a valve plug or casing should be corroded internally with fluid to make movement of the valve plug unsmooth, it is unlikely to shut down a fluid path in emergency.

SUMMARY OF THE INVENTION

In view of the disadvantages in the prior art, it is an object of the present invention to provide an emergency isolation valve apparatus to enable it to be checked without interruption of operation whether or not a valve plug connected to a pipe line can be properly closed.

BRIEF DESCRIPTION OF THE DRAWINGS

The foregoing and other features and advantages will become more apparent from the following description with respect to embodiments as shown in appended drawings wherein.

DETAILED DESCRIPTION OF PREFERRED EMBODIMENTS

Figure 1:
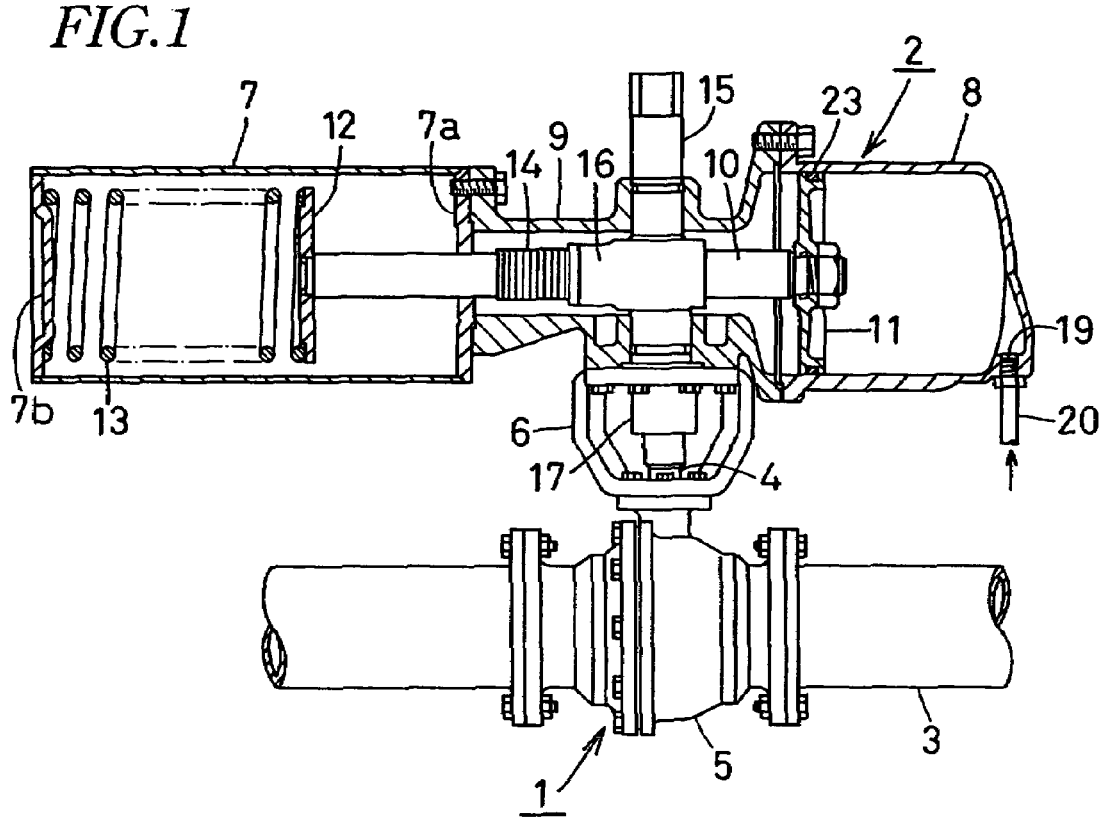
FIG. 1 is a front view of an emergency isolation valve apparatus according to the present invention, an air cylinder being vertically sectioned.
Figure 2:
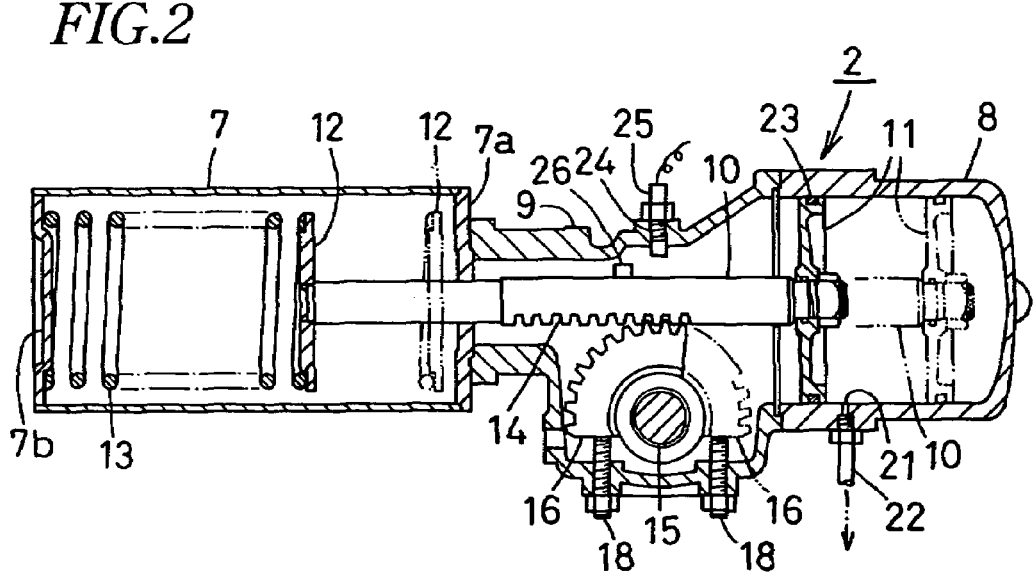
FIG. 2 is a plan view in which the air cylinder is vertically sectioned.

FIG. 1 is a partially sectional front view of an emergency isolation valve apparatus according to the present invention, and FIG. 2 is a horizontal sectional plan view of an air cylinder.

The emergency isolation valve apparatus comprises a known valve body 1 having a spherical valve plug (not shown); an air cylinder 2 for driving the valve plug 1; and a fluid control 27 (described later) for checking operation of the valve body 1.

The valve body 1 is connected to a pipeline 3 to a plant and a valve shaft 4 connected to the valve plug projects from the upper end of a valve casing 5. The upper end of the valve body 1 is connected to the lower surface of the air cylinder 2 by a yoke 6 surrounding the valve shaft 4.

The air cylinder 2 is a single-acting air cylinder which comprises a spring case 7, a pressurizing cylinder 8 and a gear case 9 between them, in which a piston rod 10 is contained to move horizontally.

At the right end of the piston rod 10, a piston 11 is in sliding contact with the inner surface of the pressurizing cylinder 8. The left end of the piston rod 10 slidably goes through a right side plate 7a of the spring case 7, and a compression spring 13 is provided between a left side plate 7b of the spring case 7 and a spring receiving plate 12 fixed to the left end of the piston rod 10. A rack 14 is axially formed on the front face of the piston rod 10 in the gear case 9.

In a front protrusion of the gear case 9, a drive shaft 15 concentric with the valve shaft 4 is disposed vertically to rotate, and a sector gear 16 which meshes with the rack 14 is mounted on the drive shaft 15. The lower end of the drive shaft 15 is connected to the upper end of the valve shaft 4 by a connector 17.

Two stopper bolts 18,18 are mounted on the front face of a gear case 9. The ends of the sector gear 16 contact the ends of the stopper bolts 18,18 to limit the maximum rotation of the sector gear 16 in clockwise and anticlockwise directions.

As shown by solid lines in FIG. 2, the piston 11 goes left with the piston rod 10, so that the sector gear 16 that meshes with the rack 14 rotates in an anticlockwise direction to contact the left stopper bolt 18. Then, the valve plug in the valve body fully opens. As shown by dash-double-dot lines, the piston moves right, so that the sector gear 16 rotates in a clockwise direction to contact the right stopper bolt 18. Then, the valve plug is fully closed.

The pressurizing cylinder 8 has an air-supply hole 19 for compressed air at the end of the circumferential wall, and the air-supply hole 19 is connected to a compressed air source such as an airtank via an air pipe 20. The pressurizing cylinder 8 has a discharge hole 21 in the circumferential wall near the piston 11 placed at the left limit in which the valve plug of the valve body 1 fully opens, and the discharge hole 21 is connected to a solenoid selector valve 30 via an discharge pipe 22. The discharge hole 21 is closed by the outer circumferential surface of the piston 11 when the piston 11 moves right.

Figure 3:
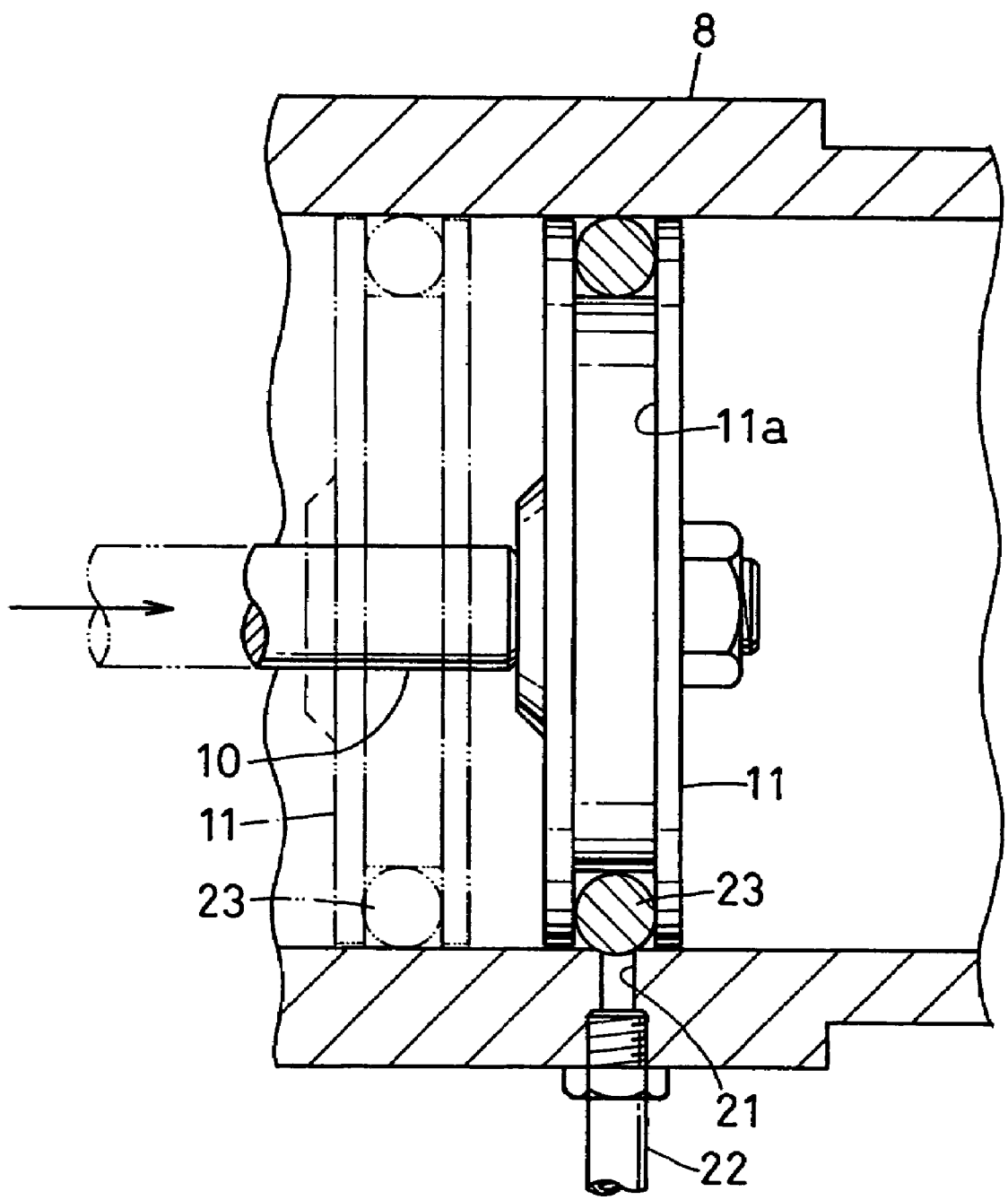
FIG. 3 is an enlarged sectional view showing relationship between a piston and a discharge hole.

As shown in FIG. 3, an O-ring 23 that is engaged in annular groove 11a on the outer circumferential surface of the piston 11 slides to put over and close an inner opening of the discharge hole 21.

In a female bore 24 on the middle rear surface of the gear case 9, a sensor 25 such as a proximity switch is secured and acts when it opposes a projection 26 on the rear surface of the rack 14.

Figure 4:
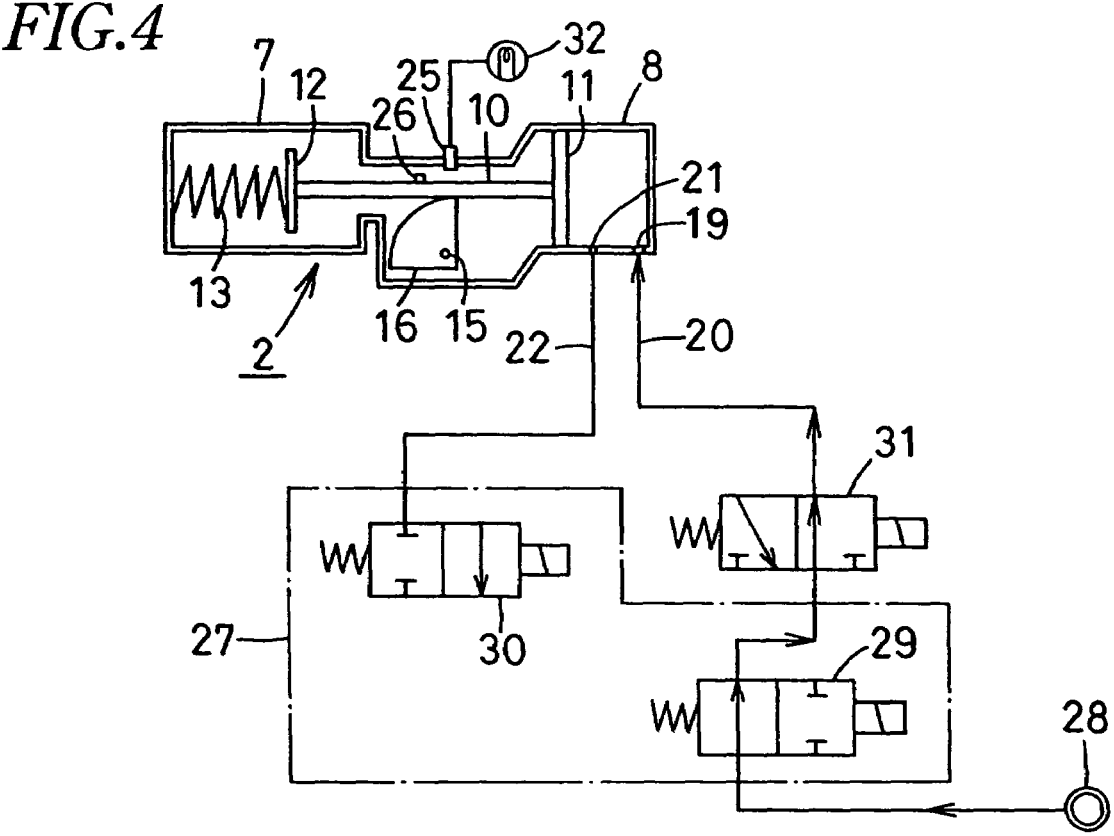
FIG. 4 is a schematic view of an emergency isolation valve apparatus and a fluid control.
Figure 5:
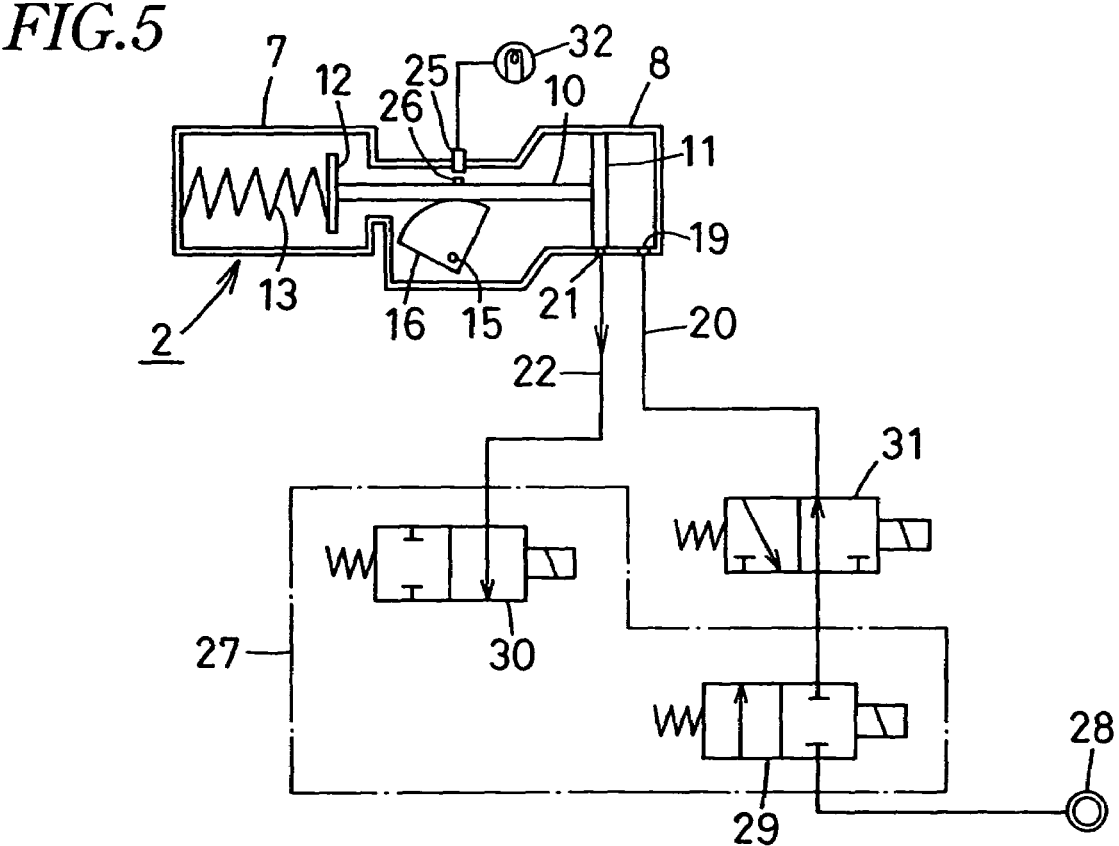
FIG. 5 is a schematic view when operation of a valve plug is checked by a fluid control.

FIGS. 4 and 5 show schematic views of the emergency isolation valve and its control system, in which means for checking operation of the valve 1 comprises the discharge hole 21 of the pressurizing cylinder 8; the sensor 25; and a fluid control 27 for controlling supply and discharge of compressed air into the pressurizing cylinder 8. The fluid control 27 comprises the first two-port two-way normally-opened solenoid selector valve 29 connected to a compressed air source 28; and the second two-port two-way normally-closed solenoid selector valve 30 connected to the discharge pipe 22 of the discharge hole 21. An output port of the first solenoid selector valve 29 is connected to a three-port two-way emergency isolation solenoid selector valve 31 which turns on with a emergency isolation signal, and the solenoid selector valve 31 is connected to the air pipe 20 for the air-supply hole 19.

In a normal condition in FIG. 4, the first solenoid selector valve 29 turns off and the emergency solenoid selector valve 31 turns on, so that air is supplied. At the same time, the second solenoid selector valve 30 turns off, so that air through the discharge hole 21 is prevented from flowing out.

Accordingly, air is supplied into the pressurizing cylinder 8 from the compressed air source 28 via the solenoid selector valves 29,31 thereby moving the piston 11 to the left limit. Thus, the valve plug of the valve body 1 is fully opened with rotation of the sector gear 16.

In this situation, when an emergency isolation signal is transmitted, the solenoid selector valve 31 turns off to switch to air-discharge mode. Air supply stops, and at the same time, air in the pressurizing cylinder 8 is discharged to the outside through a output port of the solenoid selector valve 30. As a result, the piston 11 is moved to the right limit by the compression spring 13, so that the valve plug of the valve body 1 is fully closed with rotation of the sector gear 16.

To check motion of the valve plug when it is fully opened, the fluid control 27 is operated as shown in FIG. 5. The first and second solenoid selector valves 29,30 both turn on to stop air supply from the compressed air source 28. At the same time, the discharge hole 21 is allowed to communicate with air via the second solenoid selector valve 30. Thus, compressed air in the pressurizing cylinder 8 is gradually discharged, which results in moving the piston 11 right little by little by the compression spring 13.

As shown in FIG. 3, the O-ring 23 of the piston 11 reaches to the discharge hole 21, which is closed by the O-ring 23 to stop air-discharge. Thus, force of the compression spring 13 becomes equal to air pressure in the pressurizing cylinder 8, so that rightward motion of the piston 11 and the piston rod 10 automatically stop.

The sector gear 16 rotates by predetermined range, and the valve plug of the valve body 1 is closed corresponding to the range. The degree of opening of the valve plug may be set to 20 to 30% of full opening to keep fluid flow to the plant. When the valve plug normally operates, the sensor 25 is actuated by the projection of the piston rod 10. If a pilot lamp 32 connected to the sensor 25 turns on the light, it could easily be checked whether or not the valve plug is actuated exactly.

Instead of the sensor 25, rotation of the drive shaft 15 projected from the intermediate cylinder 9 may visually be checked.

The fluid control 27 comprises the first and second solenoid selector valves 29,30. Thus, operation is checked by the sensor 25, and the operation checking test of the valve plug can be conducted on-line at a place far from the emergency isolation valve. If the operation checking test of the valve plug is conducted at the equipment, a two-port two-way hand-operated valve may be used instead of the solenoid selector valves 29,30.

Figure 6:
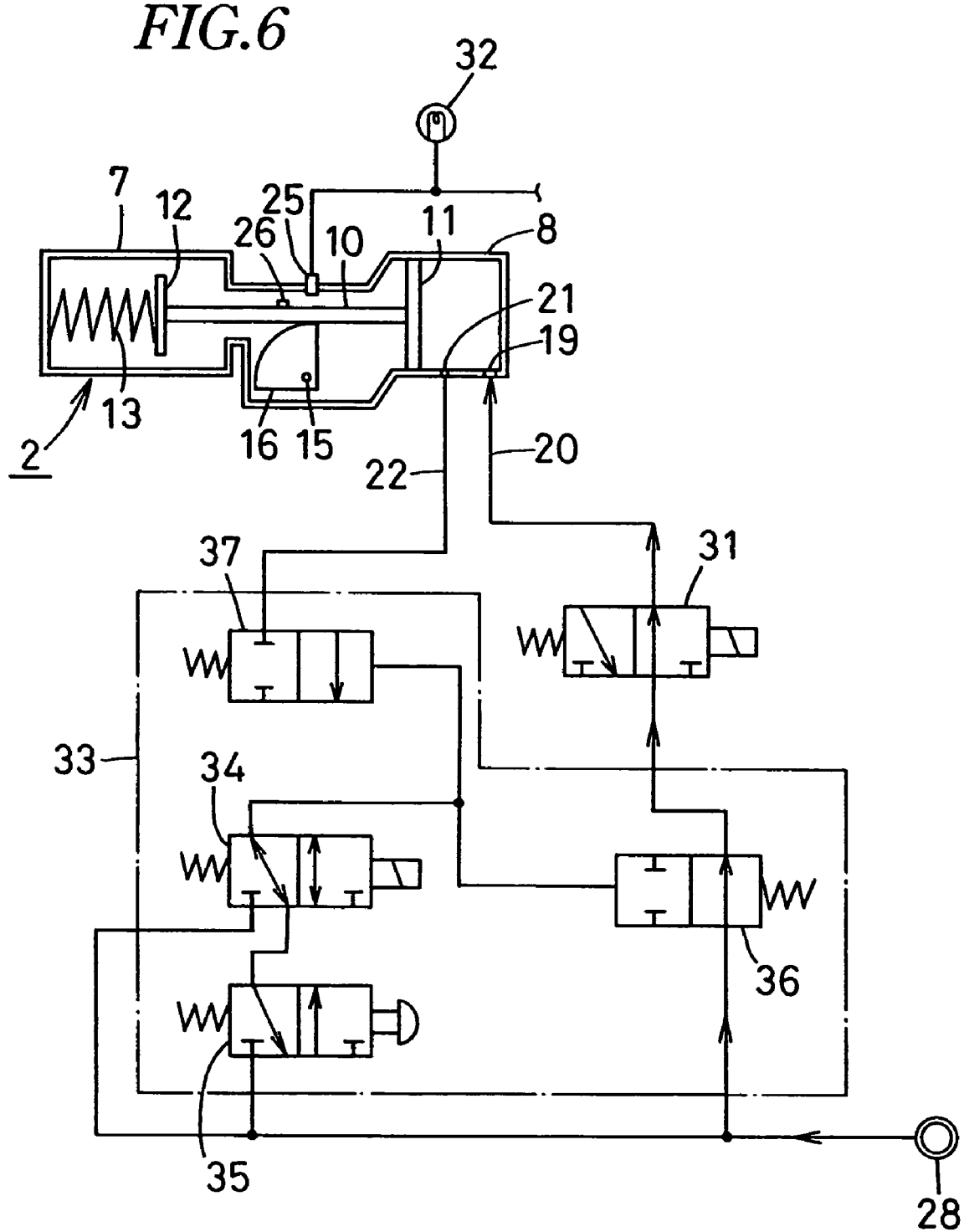
FIG. 6 is a schematic view of another embodiment of the fluid control.

FIG. 6 is another embodiment of the present invention, comprising a fluid control 33 in which operation checking test can be carried out both at the equipment and at a remote place on-line.

The fluid control 33 comprises a three-port two-way normally-closed solenoid selector valve 34 having output/input ports connected to a compressed air source 28; a three-port two-way normally-closed hand-operated selector valve 35 connected to one of the output/input ports of the selector valve 34 and the compressed air source 28; and a normally-opened pilot selector valve 36 and a normally-closed pilot selector valve 37 connected to the other output-input port of the solenoid selector valve 34 and operated by discharged air pressure from the solenoid selector valve 34.

The pilot selector valve 36 is connected to the compressed air source 28 and the emergency isolation solenoid selector valve 31, and the pilot selector valve 37 is connected to a discharge hole 21 via a discharge pipe 22.

In ordinary condition in FIG. 6, the solenoid selector valve 34 of the fluid control 33 turns off and the hand-operated selector valve 35 is not operative, so that air is not supplied to the solenoid selector valves 34,35 from the compressed air source 28. Thus, the pilot selector valve 36 is opened and the pilot selector valve 37 is closed to allow the discharge pipe 22 connected to the discharge hole 21 of a pressurizing cylinder 8 to be closed.

In normal condition, the emergency isolation solenoid selector valve 31 turns on and opens, so that compressed air is supplied into the pressurizing cylinder 8 via the pilot selector valve 36. As a result, the piston 11 is moved to the left limit as above, and a valve plug of a valve body 1 is fully opened.

In this situation, an emergency isolation signal is transmitted to the solenoid selector valve 31, which turns off, so that air in the pressurizing cylinder 8 is discharged to allow the piston 11 to move to the right limit, thereby closing the valve plug of the valve body 1 fully.

Figure 7:
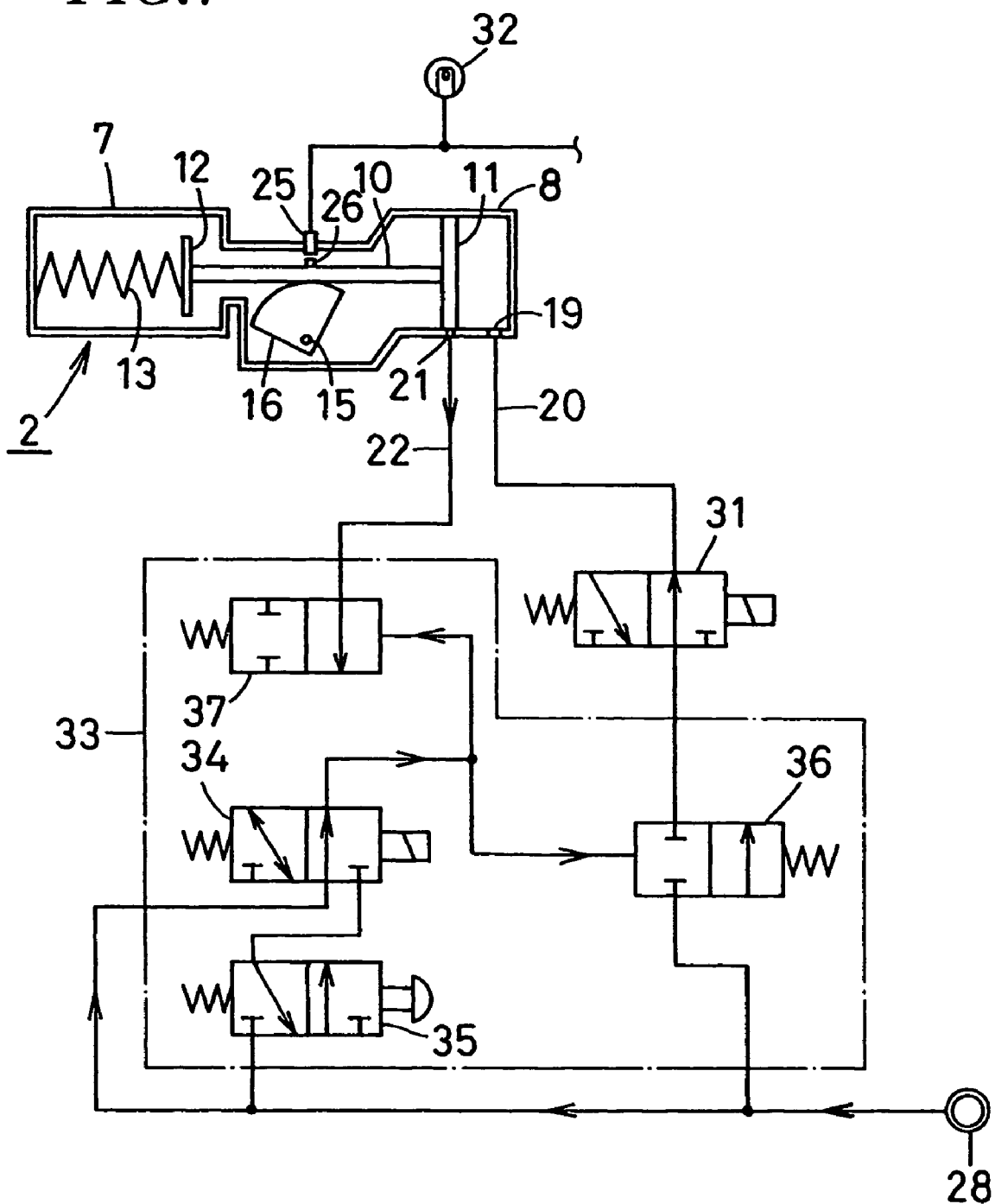
FIG. 7 is a schematic view when motion of a valve plug is checked by a solenoid selector valve.

To check whether to actuate the valve plug on-line from a remote place when it fully opens, the solenoid selector valve 34 of the fluid control 33 turns on as shown in FIG. 7. Then, a port connected to the normally-closed hand-operated selector valve 35 is closed and a formerly closed port is opened, so that air pressure from the compressed air source 28 acts simultaneously to the pilot selector valves 36,37 via the solenoid selector valve 34, so that the pilot selector valve 36 is opened and the pilot selector valve 37 is closed.

Thus, air-supply into the pressurizing cylinder 8 stops and the discharge hole 21 is opened. Air in the cylinder 8 is gradually discharged via an output port of the pilot selector valve 37.

As a result, as above, the piston 11 moves right until an O-ring 23 closes the discharge hole 21, and a sector gear 16 that meshes with a rack 14 of a piston rod 10 rotates corresponding to the motion of the piston 11, so that the valve plug of the valve body 1 is closed a little.

It can be checked whether or not the valve plug normally acts by detecting a projection with a sensor 25 to enable a signal to turn on the light of a pilot lamp 32.

Figure 8:
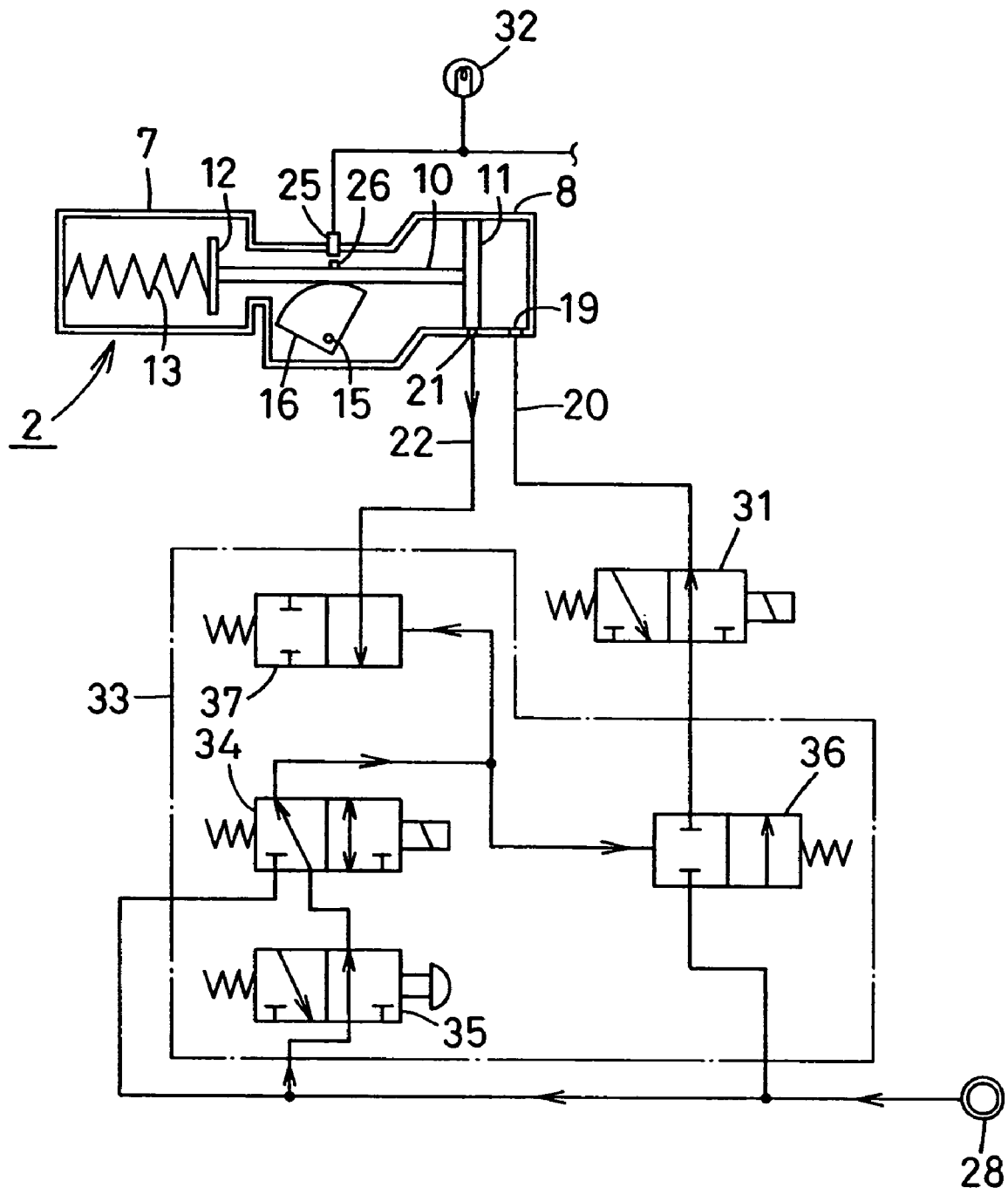
FIG. 8 is a schematic view when motion of a valve plug is checked by a hand-operated selector valve.

To check operation of an emergency isolation valve at the equipment manually, as shown in FIG. 8, a solenoid selector valve 34 of a fluid control 33 turns off. While air flow from a compressed air source 28 into it stops, a hand-operated selector valve 35 may be changed to valve-opening condition.

Then, air pressure in the compressed air source 28 acts pilot selector valves 36,37 via a hand-operated selector valve 35 and an solenoid selector valve 34 connected to an output port of the selector valve 35. So a valve plug of a valve body 1 can be checked at the equipment according to the same operation in the on-line system as above.

As described above, in the foregoing embodiments of an emergency isolation valves, checking test of whether or not a valve plug of a valve body normally operates is carried out by closing the valve plug to a certain degree of opening so as to prevent malfunctions in operation of a plant. It is not necessary to stop the plant, and its operation efficiency can be thus improved.

The discharge hole 21 is formed on the outer circumferential wall of the pressurizing cylinder 8 of the air cylinder 2 which enables the valve plug to open and close. The discharge hole 21 is opened by operating the valves 30,34 of the fluid control 27,33 to allow air in the pressurizing cylinder 8 to be discharged partially to cause depressurizing. The piston 11 is moved to the right or valve-opening direction until the discharge hole 21 is closed by the piston 11 thereby allowing it to be checked whether or not the valve plug of the valve body 1 actually acts. Thus, a fluid path is unlikely to be closed without operation of a valve plug in emergency as have been known.

Furthermore, even if an emergency isolation signal should be transmitted during checking of motion of the valve plug, the solenoid selector valve 31 turns off to allow air in the pressurizing cylinder 8 to be discharged thereby closing the valve plug fully and forcibly, which assures safety of the system.

The present invention is not limited to the foregoing embodiments.

In the foregoing embodiments, the discharge hole 21 is closed by the O-ring 23 engaged on the outer circumferential surface of the piston 11. If the piston 11 is long, the outer circumferential surface itself may close it.

A valve plug may be checked by detecting rotation of a sector gear and a drive shaft by a sensor. A buzzer may be used instead of a pilot lamp.

In the fluid control in FIG. 6, the hand-operated selector valve 35 may be omitted if operation of the valve plug is checked only at a remote place, and the solenoid selector valve 34 may be omitted if operation of the valve plug is checked only at an installation place.

An air cylinder may be applied to a double-piston-type single-acting air cylinder in which two pistons are connected via a piston rod and a drive mechanism for a valve shaft comprises a scutch- and yoke-type.

A valve body may have a sluice valve that moves in a direction perpendicular to a flow path, or a diaphragm valve plug. A valve shaft may be directly connected to a piston.

The foregoing merely relate to embodiments of the invention. Various modifications and changes may be made by persons skilled in the art without departing from the scope of claims wherein:

What is claimed is:

1. An emergency isolation valve apparatus comprising:
   a valve body having a valve plug and connected to a pipeline;
   a valve shaft connected to the valve plug of the valve body;
   a single-acting hydraulic cylinder having a piston urged by a spring and engaged with the valve shaft, pressurized fluid being supplied into the cylinder so that the piston is pressed to one end of the cylinder to allow the valve plug to open fully and being discharged in emergency so that the piston is moved to the other end of the cylinder to allow the valve plug to close fully;
   a discharge hole through an circumferential wall of the cylinder, the hole being closed by the piston when the piston moves from full-open position to allow the valve plug to close at a predetermined degree;
   a supply pipe for supplying the pressurized fluid into the cylinder;
   a discharge pipe connected to the discharge hole of the cylinder;
   a fluid control connected to the supply pipe and the discharge pipe to allow the fluid in the cylinder to be discharged until the piston closes the discharge hole, said fluid control comprising a normally-opened selector valve on the supply pipe and a normally closed selector valve on the discharge pipe, the normally-opened selector valve being closed and the normally-closed selector valve being opened so that fluid in the cylinder is discharged; and
   an emergency isolation selector valve disposed between the normally-opened selector valve and the hydraulic cylinder and configured to stop the supply of the pressurized fluid into the cylinder.

2. An emergency isolation valve apparatus as claimed in claim 1 wherein the fluid comprises compressed air.

3. An emergency isolation valve apparatus as claimed in claim 1 wherein an O-ring for closing the discharge hole is engaged in an outer circumferential surface of the piston.

4. An emergency isolation valve apparatus as claimed in claim 2 wherein the fluid control is connected to a compressed air source.

5. An emergency isolation valve apparatus as claimed in claim 1 wherein the normally-opened and normally-closed selector valves comprise solenoid valves.

6. An emergency isolation valve apparatus as claimed in claim 1 wherein a detector is provided to detect that the discharge hole is closed by the piston.

7. An emergency isolation valve apparatus as claimed in claim 6 wherein the detector comprises a sensor for detecting movement of the piston and a lamp actuated by the sensor to turn on the light.

8. An emergency isolation valve as claimed in claim 1 wherein the fluid control comprises a normally-closed solenoid selector valve on a circuit in parallel with the supply circuit; said normally-opened selector valve being a pilot operated valve actuated by pressure of fluid from said normally-closed solenoid selector valve; said normally-closed selector valve being a pilot operated valve actuated by pressure of the fluid from said normally-closed solenoid selector valve, said normally-closed solenoid selector valve being opened to close said normally-opened pilot operated selector valve and to open said normally-closed pilot operated selector valve so that fluid in the cylinder may be discharged.

9. An emergency isolation valve as claimed in claim 8 wherein the fluid control further comprises a normally-closed hand-operated selector valve connected to the fluid source, said normally closed solenoid selector valve being three-port twp way solenoid valve in which an input port is connected to the normally-closed hand-operated selector valve and an output port is connected to the normally-closed and opened pilot selector valve so that fluid in the cylinder may be discharged.

* * * * *